(12) United States Patent
Kroker et al.

(10) Patent No.: US 10,866,156 B2
(45) Date of Patent: Dec. 15, 2020

(54) SENSING SYSTEM FOR MONITORING THE INTEGRITY OF A STRUCTURE

(71) Applicant: STRUCTURAL MONITORING SYSTEMS LTD, Claremont (AU)

(72) Inventors: Henry Abe Kroker, Kelowna (CA); Trevor Blake Lynch-Staunton, West Kelowna (CA)

(73) Assignee: STRUCTURAL MONITORING SYSTEMS LTD, Claremont (AU)

( * ) Notice: Subject to any disclaimer, the term of this patent is extended or adjusted under 35 U.S.C. 154(b) by 141 days.

(21) Appl. No.: 16/092,588

(22) PCT Filed: Apr. 21, 2017

(86) PCT No.: PCT/AU2017/050368
§ 371 (c)(1),
(2) Date: Oct. 10, 2018

(87) PCT Pub. No.: WO2017/181246
PCT Pub. Date: Oct. 26, 2017

(65) Prior Publication Data
US 2019/0064029 A1    Feb. 28, 2019

(30) Foreign Application Priority Data

Apr. 21, 2016   (AU) ............................... 2016901491

(51) Int. Cl.
*G01M 5/00* (2006.01)
*G01M 3/16* (2006.01)
(52) U.S. Cl.
CPC ............ *G01M 5/0033* (2013.01); *G01M 3/16* (2013.01); *G01M 5/0008* (2013.01); *G01M 5/0091* (2013.01)

(58) Field of Classification Search
CPC .... G01M 5/0033; G01M 3/16; G01M 5/0008; G01M 5/0091; F16K 47/08
(Continued)

(56) References Cited

U.S. PATENT DOCUMENTS

| 4,503,710 A | 3/1985 | Oertle et al. |
| 5,770,794 A | 6/1998 | Davey |

(Continued)

FOREIGN PATENT DOCUMENTS

| CN | 101965906 | 10/2010 |
| WO | 2009094721 | 8/2009 |

OTHER PUBLICATIONS

European Patent Office Extended Search Report for Application No. 17785177.1 dated Dec. 4, 2019 (9 pages).
(Continued)

*Primary Examiner* — Octavia Hollington
(74) *Attorney, Agent, or Firm* — Michael Best & Friedrich LLP (57) ABSTRACT

A sensing system (10) for monitoring the integrity of a structure has first and second channels (12 and 14) arranged for sealing onto a surface (16) of the structure (18) to form respective spaced apart first and second galleries (20 and 22). A fluid (F1) is in the first gallery (20) and a fluid (F2) is in the second gallery (22). A measurement system (24) measures for a change in a pressure independent physical characteristic: a) in the first gallery (20); b) in the second gallery (22); c) between the first gallery (20) and the second gallery (22); or d) a combination of two or more of a), b) and c) where the change is dependent on a mass flow of fluid from one of, or between, the sealed galleries due to a crack in the structure. The pressure independent physical characteristic of the fluid can be the conductivity of the fluid or the optical properties of the fluid.

34 Claims, 4 Drawing Sheets

(58) Field of Classification Search
USPC .............................................................. 73/40
See application file for complete search history.

(56) References Cited

U.S. PATENT DOCUMENTS

| | | |
|---|---|---|
| 6,539,776 B2 | 4/2003 | Davey |
| 6,591,661 B2 | 7/2003 | Davey |
| 6,715,365 B2 | 4/2004 | Davey |
| 6,720,882 B2 | 4/2004 | Davey |
| 7,500,383 B2 * | 3/2009 | Davey ................. G01M 3/2869 73/49.2 |
| 8,353,197 B2 | 1/2013 | Laxton et al. |
| 2009/0121121 A1 | 5/2009 | Dunleavy et al. |
| 2012/0232807 A1 * | 9/2012 | Doyle ................... B64C 27/007 702/35 |

OTHER PUBLICATIONS

International Search Report for Application No. PCT/AU2017/050368 dated Jun. 20, 2017 (3 pages).

* cited by examiner

SENSING SYSTEM FOR MONITORING THE INTEGRITY OF A STRUCTURE

TECHNICAL FIELD

The present disclosure relates to a bistable sensing system for a structure such as but not limited to an airframe, a hull of a marine vessel or a bridge. In more general terms the disclosed bistable sensing system is applicable for structural monitoring including crack detection in structures.

BACKGROUND ART

Applicant has developed numerous systems, devices and methods for structural integrity monitoring and structural health monitoring which may be used for example to detect and/or monitor the propagation of cracks or other faults on or in a component or structure.

Examples of such systems, devices and methods are the subject of various patents including U.S. Pat. Nos. 5,770,794; 6,539,776; 6,591,661; 6,715,365; 6,720,882 and 8,353,197.

By and large the systems, devices and methods described in the above referenced patents are based on the principle of mass transfer. Vacuum is used to create a differential pressure between two channels or galleries and pneumatic permeability of an ensuring crack induces a flow of gas from a channel filled with gas at atmospheric pressure into the partially evacuated vacuum channel. When this flow exceeds a predetermined threshold a fault is noted. This technology is sometimes termed as Comparative Vacuum Monitoring or "CVM".

While CVM has been successfully used and commercialised it may have limitations in some situations.

For example when used on an aircraft all measurements must be conducted while the aircraft is on the ground. This is referred to as Periodic Inspection. However when on the ground, most of the structural components that were under stress during flight are now in compression. Full occlusion of cracks often occurs due to active compression from static loads. This effect is also seen on structures with thicker cross sections that are not under compressive loads. In these applications the structure of the component itself exerts sufficient force to prevent early detection of cracks or other structural faults.

To address the shortcomings of Periodic Inspection, Inflight Sensing has been proposed. However environmental requirements of temperature, vibration, barometric pressure, and moisture content make this approach very difficult. Moreover it is practically impossible to maintain a stable vacuum of desired magnitude in an atmosphere of high altitude flight. Inflight sensing requires electronic systems and a vacuum pump to be located in a heated area of the aircraft. This in turn requires measurement tubes to pass through a pressure bulkhead of the aircraft to connect sensors to the electronics and pump. However customers have indicated that they do not wish to create holes in bulkheads to accommodate tubing. This severely constrains applications to only those structural applications that are contained inside the pressurized body of the aircraft. Additionally a continuous flow model developed to mitigate valve performance limitations becomes highly vulnerable to freezing when warm gasses pass through cold tubes. It was consequently concluded that this approach of monitoring a crack during the stressed cycle of a structure was just as problematic as the periodic inspection approach.

Additionally there are a number of external contaminants that impact the probability of early crack or other fault detection. In normal aluminum structures a crack will expose an otherwise protected surface to atmosphere. Immediately ensuing to the exposure, corrosion will begin to convert the surface molecules to oxide. This oxide will eventually occlude a small crack. When coupled with infrequent inspection cycles this crack could disappear from detection, thus preventing early detection. Other contaminants such as condensation, deicing fluid, hydraulic fluid, and jet fuel all have varying impacts on the system, particularly to the channel that is under vacuum. Depending on the amount ingested, impacts could range from a false negative to instrument damage, and even potential explosion. A structural monitoring system that becomes significantly contaminated can require considerable effort to restore.

The presently disclosed bistable sensing system arises from further research and development by Applicant in the above field of technology.

The above references to the background art do not constitute an admission that the art forms part of the common general knowledge of a person of ordinary skill in the art.

The above reference to the background art is not intended to limit the application of the bistable sensing system disclosed herein.

SUMMARY OF THE DISCLOSURE

In broad terms embodiments of the disclosed system and method rely on mass transfer of a fluid between at least two spaced apart galleries. In the absence of a fault the mass transfer can only occur via a crack that propagates between the galleries. Also an effect of the system and method is that the fluid which enters and flows along a crack persists whether or not the structure in which the crack is formed is under dynamic load or static load. Thus for example in structural monitoring of a component of an aircraft a crack which provides a flow communication path between two galleries when the aircraft is in flight (i.e. under dynamic load) should be detected by embodiments of the disclosed method and system when the aircraft is on the ground even though the crack may be fully closed under static load due to the presence of the fluid in the crack. This system is said to be bi-stable because it is designed to be stable in two modes. Compromised and uncompromised.

In a first aspect there is disclosed a bistable sensing system for a structure the system comprising:
  at least a first channel and a second channel arranged for sealing to a surface of the structure to form respective spaced apart sealed first and second galleries;
  a fluid contained within each of the sealed galleries; and
  a measurement system arranged to measure a pressure independent physical characteristic (a) in the first sealed gallery; (b) in the second sealed gallery; (c) between different galleries; or (d) a combination of two or more of (a), (b) and (c) where the change is dependent on a mass flow of fluid between the sealed galleries.

In one embodiment the system comprises at least one sensing device in each galley wherein the at least one sensing device is connected to or otherwise in communication with the measurement system. The nature of the at least one sensing device is dependent on the physical characteristic to be measured and will this vary from application to application, examples of the sensing devices include but are not limited to electrodes; optical sensors; and magnetic, capacitive or inductive couplers.

In one embodiment the system comprises a plurality of sensing devices in each gallery.

In one embodiment the measurement system is arranged to measure a physical characteristic between respective sensing devices in different galleries.

In a second aspect there is disclosed bistable sensing system for a structure the system comprising:
- at least a first channel and a second channel arranged for sealing to a surface of the structure to form respective spaced apart sealed first and second galleries;
- a fluid contained within each of the sealed galleries;
- a plurality of sensing devices in each of the galleries; and
- a measurement system connected to the sensing devices, the measurement system arranged to measure a physical characteristic between the sensing devices in each of the sealed galleries and across the sensing devices of respective galleries.

In one embodiment of either aspect the fluid is at a pressure differential in comparison to ambient pressure.

In one embodiment of either aspect one or more compensation galleries may be provided which contain respective volumes of a fluid and are arranged to isolate the fluid from the surface of the structure, the one or more compensation galleries further including at least one sensing device capable of connection to the measurement system.

In one embodiment at least one of the compensation galleries is located between the first and second galleries.

In one embodiment each of the compensation galleries, the first gallery and the second gallery are arranged to hold substantially the same volume of fluid.

In one embodiment either: (a) the one or more compensation galleries comprise a single compensation gallery containing a fluid that comprises a mixture of respective fluids contained within the first gallery and the second gallery; or (b) the one or more compensation gallery comprise a first compensation gallery containing a volume of the first fluid, and a second compensation gallery containing a volume of the second fluid.

In one embodiment the measurement system is arranged to use measurements of the physical characteristic of fluid held within the one or more compensation galleries to compensate for environmental effects on measurements made in relation to the first and second galleries.

In one embodiment of either aspect the measurement system is arranged to perform a measurement cycle comprising either (a) measurements of the physical characteristic of the fluid in respective galleries to provide an indication of operational status of the respective galleries; and in an event of a change in such characteristics to provide an indication of integrity of the structure between the spaced apart galleries; or (b) measurements of the physical characteristic of the fluid in respective galleries to provide an indication of operational status of the respective galleries; and measurements of the physical characteristics across the sensing devices of different galleries to provide an indication of integrity of the structure between the spaced apart galleries.

In one embodiment of either aspect the physical characteristic is an electrical characteristic.

In one embodiment the electrical characteristic is conductance or impedance.

In one embodiment either aspect the fluid is an electrically conducting liquid.

In one embodiment of either aspect a first fluid is contained within the first gallery and a second fluid is contained within the second gallery wherein the first and second fluids are different to each other.

In one embodiment the physical characteristic is the presence of the first fluid in the second gallery or the second fluid in the first gallery. However in an alternate embodiment the physical characteristic is the presence of a third fluid arising from a reaction between the first fluid and the second fluid.

In one embodiment either aspect the sensing devices comprise electrodes.

In one embodiment each gallery comprises three electrodes. However in an alternate embodiment each gallery may comprise four electrodes.

In an alternate embodiment the physical characteristic is a variation in a spectral signature of the first fluid or the second fluid arising from a contamination of the first fluid by the second fluid or the contamination of the second fluid by the first fluid. In one non limiting example of this embodiment the first fluid may contain nanoparticles which when excited by an electromagnetic signal provides a first spectral signature and the second fluid may contain nanoparticles which when excited by the same electromagnetic signal provides a second different spectral signature. It should however be understood that the spectral signature embodiments does not rely on only nanoparticles to provide detectable spectral differences. This embodiment is applicable to any fluids which have different spectral response to electromagnetic radiation. For example the fluids could be or carry liquid dyes. Also the electromagnetic radiation need not necessarily be visible light and could for example include ultraviolet radiation, infrared radiation or a laser. In this embodiment the at least one sensing device may comprises an optical sensor. The spectral response may also relate to changes in polarisation of the EM radiation due to mixing of one fluid with another.

In a third aspect there is disclosed method of monitoring the integrity of a structure comprising:
- installing at least a first channel and a spaced second channel on the structure wherein a surface of the structure together with the respective first channel and second channel form respective first and second galleries;
- placing fluids in the cavities; and
- monitoring for a change in a pressure independent physical characteristic in the galleries or between the galleries; and wherein the change arises from a mass flow of fluid form any one of, or between at least two of, the galleries.

In one embodiment the monitoring is in relation to a pressure independent physical characteristic of the fluid in one or more of the galleries.

In one embodiment the monitoring is in relation to a pressure independent physical characteristic measured between at least two of the galleries.

In one embodiment monitoring for a change in a pressure independent physical characteristic comprises monitoring for change in one or more of: (a) an electrical characteristic; (b) a chemical characteristic; and (c) an optical characteristic, of a fluid in one or more of the galleries.

In one embodiment the method comprises:
- installing one or more compensation galleries near at least one of the first and second galleries and in fluidic isolation from the surface of the structure;
- placing a fluid in the one or more compensation galleries; and
- monitoring for a change in the same pressure independent physical characteristic of the fluid in the one or more compensation galleries as in the first and second galleries.

In one embodiment placing fluids in the cavities comprises placing a first fluid in the first cavity and a second fluid in the second cavity wherein the first fluid is different to the second fluid.

In one embodiment the monitoring comprises monitoring for presence of the first fluid in the second gallery or the second fluid in the first gallery.

In one embodiment the monitoring comprises monitoring for presence of a third fluid derived from mixing of the first fluid with the second fluid.

In one embodiment placing fluids in the cavities comprises placing a first fluid carrying nanoparticles of a first spectral signature in the first cavity and placing a second fluid carrying nanoparticles of a second different spectral signature in the second cavity.

In a fourth aspect there is disclosed a bistable sensing system for a structure the system comprising:
- at least a first channel and a second channel arranged for sealing to a surface of the structure to form respective spaced apart sealed first and second galleries;
- a fluid contained within each of the sealed galleries;
- a plurality of sensors in each of the galleries; and
- a measurement system connected to the sensors, the measurement system arranged to measure for a change in a pressure independent physical characteristic between the sensors (a) in the first sealed gallery; (b) in the second sealed gallery; (c) in different galleries; or (d) a combination of two or more of (a), (b) and (c), where the change is dependent on a mass flow of fluid between the sealed galleries along a crack formed in the structure between the first and second galleries.

In a fifth aspect there is disclosed a bistable sensing system for a structure the system comprising:
- at least a first channel and a second channel arranged for sealing to a surface of the structure to form respective spaced apart sealed first and second galleries;
- a fluid contained within each of the sealed galleries;
- a plurality of sensors in each of the channels; and
- a measurement system connected to the sensors, the measurement system arranged to measure a physical characteristic between the sensors in each of the sealed galleries and across the sensors of respective galleries.

In a sixth aspect there is disclosed a bistable sensing system for a structure the system comprising:
- at least a first channel and a second channel arranged for sealing to a surface of the structure to form respective spaced apart sealed first and second galleries;
- a first fluid contained within the first gallery and a different second fluid contained within the second gallery;
- a plurality of sensors in each of the channels; and
- a measurement system connected to the sensors, the measurement system arranged to measure a physical characteristic between the sensors in each of the sealed galleries and provide an indication of a defect in the structure upon detection of a variation in the physical characteristics in either one or both of the first and second galleries.

BRIEF DESCRIPTION OF THE DRAWINGS

Notwithstanding any other forms which may fall within the system and method as set forth in the Summary, specific embodiments will now be described, by way of example only, with reference to the covering drawings in which.

DETAILED DESCRIPTION OF SPECIFIC EMBODIMENTS

Figure 1:
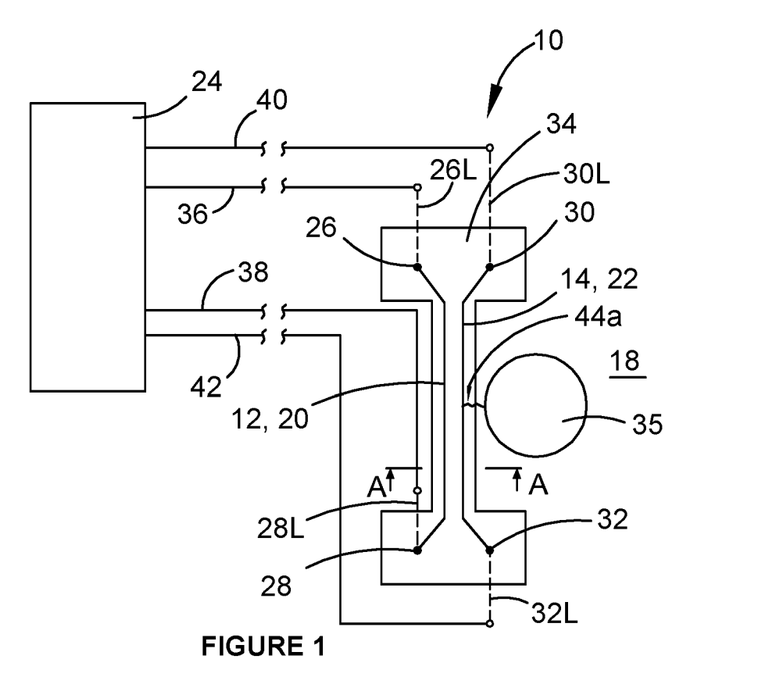
FIG. 1 is a schematic representation of a sensor pad that may be incorporated in one embodiment of the disclosed bistable sensing system and associated method of monitoring the integrity of the structure.
Figure 2:
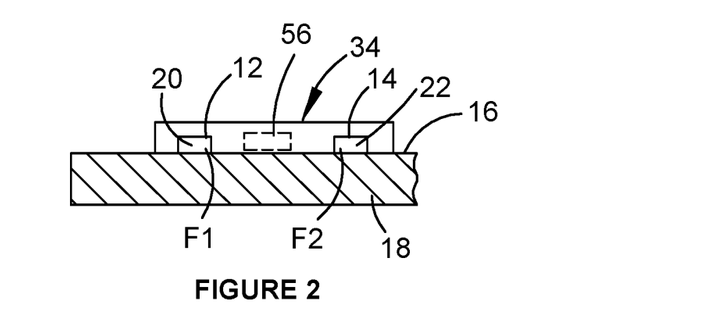
FIG. 2 is a view of section A-A of the sensor shown in FIG. 1.

FIGS. 1 and 2 illustrate components of an embodiment of the disclosed bistable sensing system (BSS) 10. The BSS 10 in this embodiment has a first channel 12 and a second channel 14 that are arranged for sealing onto a surface 16 of a structure 18. When sealed onto the structure 18 the first and second channels 12 and 14 form respective spaced apart first and second galleries 20 and 22. A fluid F1 is in the first gallery 20 and a fluid F2 is in the second gallery 22. As explained later below in some embodiments the fluid F1 is the same as the fluid F2. However in other embodiments the fluids F1 and F2 are different from each other. The BSS 10 also has a measurement system 24 that is arranged to measure for a change in a pressure independent physical characteristic:
  a) in the first gallery 20,
  b) in the second gallery 22,
  c) between the first gallery 20 and the second gallery 22, or
  d) a combination of two or more of a), b) and c).

In order to facilitate the measurement of the pressure independent physical characteristics, embodiments of the BSS 10 may incorporate at least one sensing device in each gallery which is connected to the measurement system 24. As explained in greater detail below the sensing devices may be in the form but not limited to, for example electrodes or optical sensors.

In the embodiment shown in FIG. 1 there are two sensing devices 26 and 28 in the first gallery 20 and two sensing devices 30 and 32 in the gallery 22. The sensing devices can, but do not necessarily need to, be in direct physical contact with the fluid in the galleries 20, 22. For example there could be magnetic, capacitive or inductive coupling between the sensing devices and the fluid.

The BSS 10 in the embodiment of FIG. 1 the channels 12 and 14 are formed in a sensor pad 34. The sensing devices 26, 28, 30 and 32 are conveniently embedded in the pad 34. Additionally, respective leads 26L, 28L, 30L and 32L may be embedded in but also extend from the sensor pad 34 to facilitate connection to respective leads 36, 38, 40 and 42 of the measurement system 24.

In the embodiment of the BSS 10 shown in FIGS. 1 and 2 the fluid F1 and the fluid F2 may be the same and each may comprise an electrically conductive liquid. Also in this embodiment the sensing devices 26, 20, 30 and 32 are simple electrodes.

Figure 3:
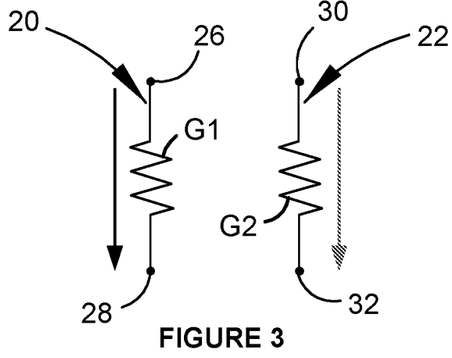
FIG. 3 is a schematic representation of the galleries incorporated in an embodiment of the sensing system when a measurement system incorporated in the sensing system relies on measurements of electrical conductance to provide an indication of the integrity of the structure.

With reference to FIG. 3 the measurement system 24 is now arranged and/or operated to measure the physical characteristic of electrical conductance (or impedance) of the galleries 20 and 22. (It is of course assumed that the sensor pad 34 is sealed onto a nonconductive surface 16. If the surface 16 is conductive (for example due to it being made from a conductive material) then a nonconductive insulating layer is applied between the pad 34 and a surface 16.)

The measurement system 24 will measure a conductance G1 in the gallery 20 and a conductance G2 in the gallery 22. The precise value of the measured conductance is of no significance. The measurement system 24 may be selectively operated to take these measurements: periodically for example, but not limited to, every second or every minute or every 10 minutes; continuously; or on demand. A substantially constant measurement of conductance G1 and G2 at each measurement period indicates a continuity and integrity of the galleries 20 and 22.

Figure 4:
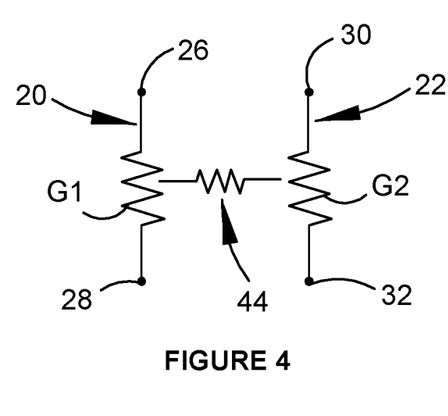
FIG. 4 is an electric circuit equivalent of the galleries shown in FIG. 3 when a crack propagates between the galleries and facilitates mass flow of fluid between the galleries.
Figure 5:
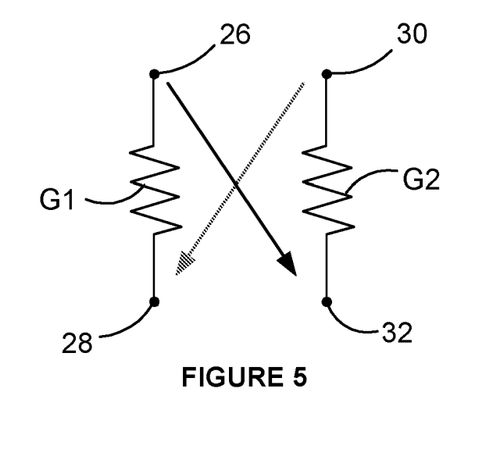
FIG. 5 is a schematic representation of conductance measurements made for determining the existence or otherwise of a crack in a surface of the structure that extends between the first and second galleries shown in FIG. 3.

FIG. 4 illustrates the arrangement of galleries 20 and 22 shown in FIGS. 1-3 but where a crack 44 has propagated between the galleries 20 and 22. The crack 44 provides a communication channel between the galleries 20 and 22 particularly when the structure 16 is under dynamic load. Under such dynamic load the crack 44 is highly likely to continually open and close and consequently act as a peristaltic pump to assist in transferring the fluids F1 and F2 between the galleries 20 and 22.

In this embodiment of the BSS 10, the measurement system 24 not only measures the physical characteristic of conductance in each of the galleries 20 and 22 but can also measure electrical conductance between the galleries 20 and 22. This can be achieved by taking a measurement of conductance between the electrodes 26 and 32; or between electrodes 22 and 28; or both.

When there is no crack 44, or at least no crack 44 of sufficient length to extend between and breach the galleries 20 and 22, the conductance measurements between the galleries 20 and 22 will be zero. However a non-zero conductance measurement between the galleries 20 and 22 provides an indication of the existence of the crack 44. The non-zero conductance measurement should or at least is highly likely to also be recorded under static load condition because the fluid F1, F2 will remain in the crack 44 even when closed providing a conductance path between the galleries 20 and 22. This provides the "bistable" aspect of the disclosed system and method in that the system is stable in two modes irrespective of the load conditions. The BSS 10 will provide a reading indicative of the existence of a crack between the two galleries 20 and 22 irrespective of whether the crack 44 is opened or closed.

FIG. 1 depicts the sensor pad 34 near a fastener such as a rivet 35. The crack 44a is shown as extending from the fastener 35 to the gallery 22. This may lead to a flow of fluid F2 from the gallery 22 along the crack 44 toward the fastener 35. As a result the conductance measurements between the electrodes 30 and 32 in the gallery 22 may change due to a decreased concentration of the fluid F2. The BSS 10 is able to measure and compare this change to a threshold. It will be recognised that this change may be either the indication of a crack 44a or indeed a fault such as a separation or loss of seal between the channel 14 and the surface 16. The latter may be considered to be a "false positive" indication of a crack. However if there is no change in the conductance measurement within the gallery 20 and more particularly no change in conductance measurement between the galleries 20 and 22 (i.e. between electrode 26 and electrode 32; or electrode 32 and electrode 28) then the BSS 10 will not provide an indication of a crack of a length or configuration sufficient to provide a communication path between the galleries 20 and 22.

In the above-described embodiment the BSS 10 is described as having four sensing devices 26, 28, 30 and 32 each in the form of electrodes. However one or more reference electrodes may be also be provided as is well understood in the art to compensate for the effect of the leads between the measurement system 24 and the electrodes 26, 28, 30 and 32. This is explained in greater detail with reference to enclosed FIGS. 6-8.

Figures 6, 7, 8:
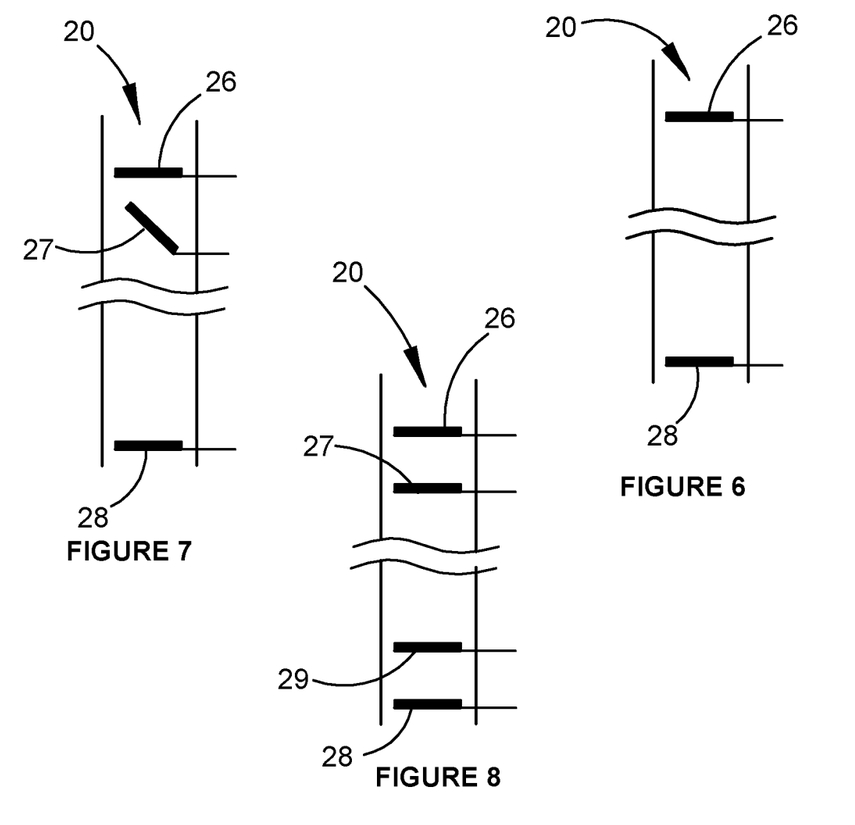
FIG. 6 is a schematic representation of one gallery of the sensor shown in FIG. 1 which utilises two sensing devices.
FIG. 7 is a schematic representation of one gallery of the sensor shown in FIG. 1 which utilises three sensing devices.
FIG. 8 is a schematic representation of one gallery of the sensor shown in FIG. 1 which utilises four sensing devices.

FIG. 6 depicts a single gallery 20 with the electrodes 26 and 28 near opposite ends of the gallery 20. This is the arrangement described above in the BSS 10 described in relation to FIGS. 1-5. It is well known in the measurement arts that when measuring electrical characteristic such as conductance or impedance the actual measurement device itself and in particular the leads or conductors that connect the measurement device to a component whose conductance or resistance is being measured can have a significant impact on the actual measurement. For example if one is attempting to obtain measurements of resistance of say fractions of an ohm and leads used in the measurement system have a resistance of the same order of magnitude or even one or two orders of magnitude lower, the lead resistance will taint the actual resistance measurement if uncompensated.

Moreover electrochemical measurements are generally high in impedance. The use of compensation electrodes compensate the measurement system for the effects encountered in an interface between the metallic conduction in a wire and the electrochemical ionic conduction of the electrolyte (fluid). Typically the largest effect is called the double layer which is a thin ion deleted region at the electrode-fluid interface. The effect of the double layer is capacitive. Impedimetric methods such as voltammetry and amperometry are impeded by this capacitance. The insertion of the compensating electrodes into this system corrects the applied signal by providing a feedback to the amplifiers. For EIS (electro impedance spectrometry) and AC resistance measurements this may not be required as the nature of an AC signal will allow it to pass through the capacitance formed by the double layer FIG. 7 depicts a variation in the embodiment of the BSS 10 where an additional compensating sensing device in the form of electrode 27 is placed in the gallery 20 near the electrode 26. In such a variation a similar additional compensating sensing device would be placed in the gallery 22.

FIG. 8 depicts a further variation in the embodiment of the BBS 10 where a second compensating sensing device in the form of electrode 29 is placed on the gallery 20 near the electrode 28. In this variation the gallery 22 will also be provided with two compensating sensing devices/electrodes.

The electrodes 26, 28, 30 and 32 may consist of formed wire or metalized regions. Additionally rather than the electrodes being formed as a single point or strip electrode they may be arranged to provide area based measurement such as shown with reference to FIG. 9. Here each of the electrodes is interdigitated to provide measurement over a substantial area of the respective galleries rather than simply at opposite ends. For example the electrode 26 comprises a bus Ba that extends along the length of the gallery 20 and a plurality of connected perpendicular fingers 46. The electrode 28 is formed with a bus Bb that extends along the length of the gallery 20 parallel to but spaced from the bus Ba and having a plurality of connected perpendicular fingers 48. The fingers 46 and 48 interleave with each other over a substantial portion of the length of the gallery 20.

Figure 9:
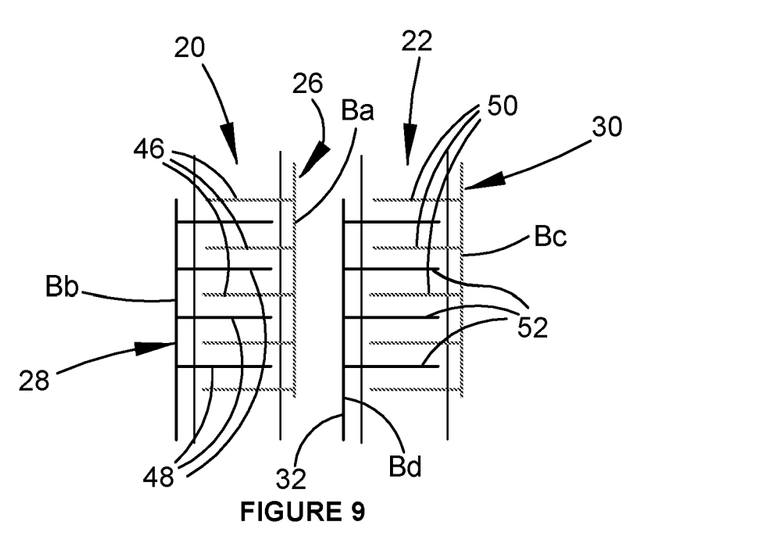
FIG. 9 is a schematic representation of an interdigitated sensing device configuration which may be incorporated in any embodiment of the disclosed bistable sensing system and associated method of monitoring the integrity of a structure.

Similarly the electrodes 30 and 32 are provided with respective buses Bc and Bd with corresponding connected perpendicular fingers 50 and 52.

Figure 10:
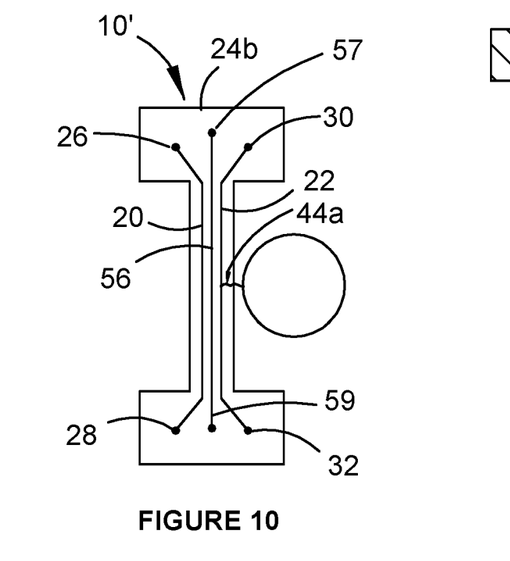
FIG. 10 is a schematic representation of a sensor pad that may be incorporated in a second embodiment of the disclosed system shown which differs for the pad shown in FIG. 1 by the inclusion of a compensating gallery.

FIG. 10 depicts another embodiment of the bistable sensing system designated as 10' which differs from the BSS 10 only by way of the inclusion of a compensation gallery 56 is located near the galleries 20 and 22. The gallery 56 is also illustrated in phantom line in FIG. 2. (While only one compensation gallery 56 is shown in this embodiment, as explained later other embodiments may comprise more than one compensation gallery). The gallery 56 contains a volume of the fluid F1, F2, or a mixture thereof and is isolated from the surface 16 of the structure 18. Therefore the gallery 56 is not affected by the existence or propagation of the crack 44a.

The compensation gallery 56 is also provided with sensing devices/electrodes 57 and 59 of identical configuration to those in the galleries 20 and 22. Continuity measurements will be made of the same pressure independent physical characteristic in the gallery 56 as in the galleries 20 and 22. The purpose of the compensation gallery 56 is to enable compensation for environmental effects on the measurement of the pressure independent physical characteristic compensation. These environmental effects may include for example changes in temperature. Such changes can for example result in a change in energy level of the fluid in the galleries 20 and 22. However the same change will also be expected in the compensation gallery 56. Any change detected in the compensation gallery 56 is subtracted from any change detected during continuity measurements of the main sensing galleries 20 and 22.

Therefore if continuity measurements indicate a change in a physical characteristic in one or both of galleries 20 and 22 and the same change is detected in the compensation gallery 56, which as mentioned before is physically isolated from the surface 16, then it is highly likely that the change is due to environmental effects rather than due to the existence of a crack 44.

The compensation gallery 56 should preferably have the same physical characteristics and configuration as the galleries 20 and 22. That is, the gallery 56 should have the same length, width and depth is galleries 20 and 22. Also the compensation gallery 56 should preferably be co-located with the galleries 20 and 22. In one example the compensation gallery 56 may be between the galleries 20 and 22. Also the gallery 56 should hold the same volume of fluid as the galleries 20 and 22 and at the same pressure.

When the fluid F1 and F2 are the same then the gallery 56 will also hold the same fluid. In the event of the fluid F1 and F2 are different (for example as described in later embodiments) there are two options for the compensation gallery 56. In a first option the gallery 56 may be filled with an equal mixture of the fluids F1 and F2. However in a second option the compensation gallery 56 may be one of two compensation galleries, one containing the fluid F1 and the other containing the fluid F2.

The embodiments of the BSS 10 and BSS 10' may be classified as "conductance" embodiments in that they rely on a measure of electrical conductance between the galleries 20 and 22 (i.e. from one electrode in one gallery to another electrode in the other gallery) to provide an indication of the existence of a crack 44. However other embodiments of the BSS 10 may utilize alternate pressure independent physical characteristics in order to sense for the existence of a crack 44. Such characteristics may require measurement only within the specific galleries rather than between the galleries. Examples of these embodiments are a "contamination" embodiment and a "reaction" embodiment both of which are explained below.

In the "contamination" embodiments of the BSS 10 the fluids F1 and F2 are different from each other. In these embodiments the measurement system 24 is arranged to detect contamination of one of the fluids by the other of fluids. A chemical signature is generated and verified for the fluids F1 and F2 during continuity portions of a measurement cycle of the measurement system 24. The detection of the chemical signature of the fluid F1 in the second gallery 22, or conversely the detection of the chemical signature of the fluid F2 in the first gallery 20 arises from a mass transfer of the fluid from one gallery into the other gallery. In the absence of a fault in the BSS 10, this is indicative of a crack 44 which extends between the galleries 20 and 22. Such a crack 44 provides a communication path between the galleries 20 and 22 to enable the flow of the fluids F1 and F2. In particular the natural opening and closing of a crack tip and a dynamic loading with the capillary action of the fluids will provide motive force for the fluids.

Optionally the fluids F1 and F2 in the galleries 20 and 22 respectively may also be under a pressure differential referenced to ambient pressure. In different circumstances and applications this may be either a positive or a negative differential. In the present embodiment a positive differential or preload is applied to the fluids F1, F2 to further assist in facilitating mass flow of the fluid from one gallery to the other. In an alternate embodiment there can be a fluid pressure differential between the galleries 20, 22. For example fluid pressure in a gallery which is to be closest to a possible crack initiation site may be greater than the fluid pressure in an adjacent gallery that is spaced further from the initiation site.

In the contamination embodiments standard electrochemical measurement techniques such as amperometric, voltametric and impedance spectroscopy can be used. Thus embodiments of the disclosed system and method are not limited to electrical measurements described in relation to the embodiment shown in FIGS. 1-9. It should also be understood that as a result embodiments of the disclosed system and method are not constrained to relying upon measurements of a physical characteristic between the galleries 20 and 22. Measurements within the galleries 20 and 22 alone may be used in various embodiments to provide the indication of the existence of a crack 44 that extends between the galleries 20 and 22. Optical techniques involving absorption and/or fluorescence can also be employed.

Figure 11:
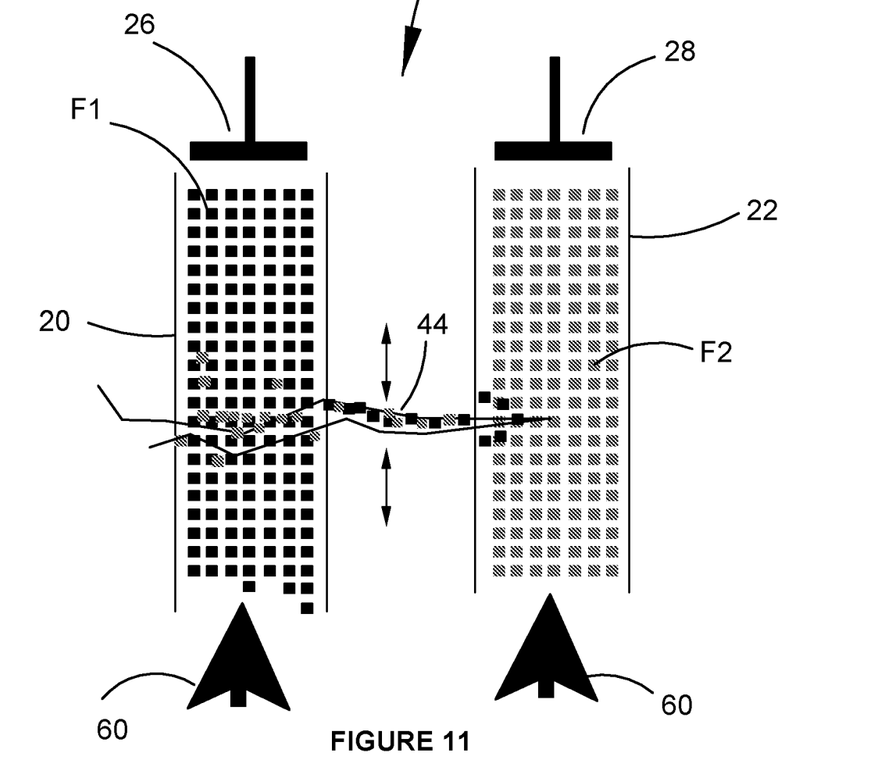
FIG. 11 is a schematic representation of a third embodiment of the disclosed bistable sensing system and associated method of monitoring the integrity of the structure in which a variation in a pressure independent characteristic of a fluid in either one or both of the sensing gallery, but not a variation measured between the galleries is used to sense for the existence of a crack extending between the galleries.
Figure 12:
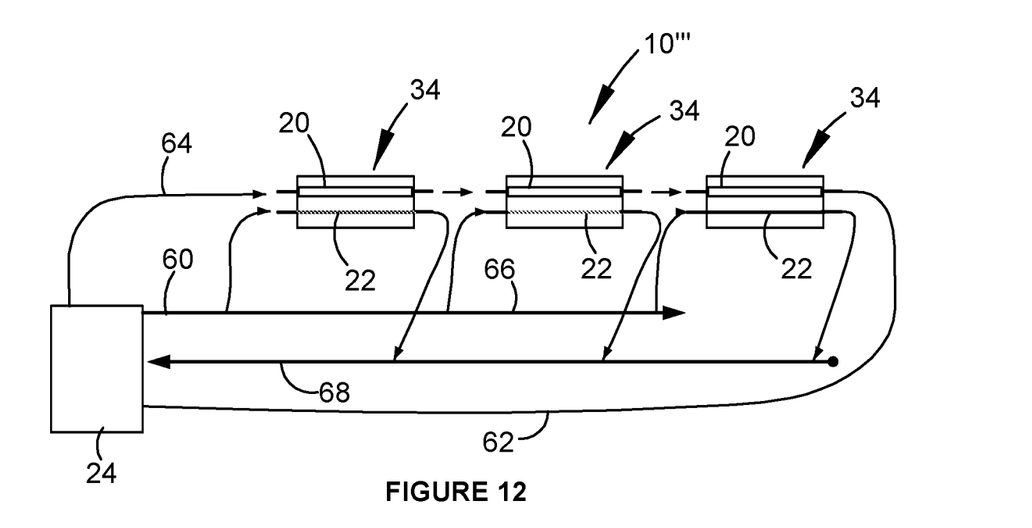
FIG. 12 is a schematic representation of fourth embodiment of the disclosed bistable sensing system utilising a plurality of connected sensors pads similar to that shown in FIG. 11 but connected together in a serial manner.

FIGS. 11 and 12 illustrate an embodiment of the BSS 10" which relies on detecting optical characteristics of fluids within the galleries to provide an indication of the existence of a crack 44 in the structure 18. One benefit of this embodiment is that it does not require electrical signals to be communicated between the measurement system 24 and the galleries 20, 22. Rather optical signals can be used. This can be of great benefit where structural monitoring is required in regions where the use of electrical signals may be hazardous. Examples of this include fuel tanks in the aircraft and reactors in chemical plants.

With reference to FIG. 11 the BSS 10" the galleries 20 and 22 are filled with a liquid containing fluorescent nanoparticles. The nanoparticles in respective galleries are arranged to fluoresce at different wavelengths. For example the fluid F1 in gallery 20 may have fluorescent nanoparticles that fluoresce at the red wavelengths while the fluid F2 in the gallery 22 may have nanoparticles that fluoresce at green wavelengths. In this embodiment the sensing devices 26 and 28 are in the form of optical detectors. It will be noted that in contrast with earlier embodiments each gallery has only a single detector. However in addition each gallery is also provided with an optical input/exciter 60 which radiates the fluids F1, F2 with optical radiation of a bandwidth which at least extends between and includes those that cause fluorescence of the nanoparticles in both of the fluids F1, F2. The optical detectors 26, 28 are coupled by optical fibers to the measurement system 24.

During initial calibration of the BSS 10" the measurement system 24 will acquire an optical signature for each of the galleries 20 and 22. When the BSS 10" is in operation measurement system 24 will make periodic measurements of the optical response to the optical input 60 and compare this with the respective signatures. The periodic measurements of the system 24 operate simultaneously as continuity measurements for each of the galleries 20, 22 as well as crack detection measurements. An expectation during continuity measurement is that if there is a leak in the galleries due for example to a partial separation of the sensor pad 34 from the surface 18, then there will be an attenuation in the optical response without a change in wavelength. However in the event of a crack 44 propagating so as to provide fluid communication between the galleries 20 and 22 the expected optical response will be a change detected fluorescent wavelength in one or both of the galleries 20 and 22 arising from the contamination of one fluid by the other.

FIG. 12 illustrates a further embodiment of the BSS designated as 10''' which is a derivation and extension of the BSS 10". In the BSS 10''' a plurality of sensor pads 34 is coupled to the measurement system 24. Each sensor pad 34 has a gallery 22 which contains fluorescent nanoparticles, with different galleries 22 containing nanoparticles that fluoresce at different wavelengths. Each pad 34 also has a gallery 20 that contains a clear suspension fluid. The galleries 20 are ganged together in a serial manner. The fluid in galleries 20 is circulated via conduits 62 and 64 through the measurement system 24. The galleries 22 in the respective sensor pads 34 may be spectrally coded with fluorescent nanoparticles unique to the specific sensor pad and its location.

The spectral input/exciter 60 transmits the exciting wavelength to each of the galleries 22 via an exciter optical fibre backbone 66. The optical response to the exciting wavelength is transmitted to the measurement system 24 via a verification optical fibre backbone 68. The measurement system 24 is arranged to measure the optical response of the clear suspension fluid being circulated through the galleries 20. Should this response include spectral components having wavelengths corresponding to the expected response from the fluorescent nanoparticles it may be concluded that a crack exists. The location of the crack can be isolated to the location of the sensor pad 34 having the gallery 22 which contains the nanoparticles that provide the corresponding spectral response.

In the "reaction" embodiments of the BSS 10 the fluids F1 and F2 are different from each other and arranged so that a third chemically distinct fluid F3 is produced when the chemicals F1 and F2 contact each other. The measurement system 24 is arranged to sense for the fluid F3 (in addition to monitoring for the fluids F1 and F2 at least for integrity measurement). A change in concentration of fluid F1 or F2 may be indicative of either: the commencement and initial propagation of a crack; or a separation of the sensor pad 34 from the surface 18. However the detection of the fluid F3 is likely to be indicative of a crack propagating between and the galleries 20 and 22 enabling mixing of the fluid F1 and F2.

Whilst specific embodiments of the bistable monitoring system and associated method of structural monitoring have been described in detail, it should be appreciated that the system and method may be embodied in many other forms. For example in each of the embodiments of the sensor pads 34 have been shown each with only two sensor galleries 20 and 22. However the sensor pads 34 may have more sensor galleries. This enables monitoring of crack propagation and propagation rate for a greater length than may be achieved by having only two sensor galleries. Also, the sensor galleries 20 and 22 are shown as being configured as straight galleries. However the galleries may be other configurations such as concentric circles. This of course requires a reconfiguration of the corresponding sensor pads 34. Such sensor pads may be dimensioned to have a central opening that can be placed about a feature such as a head of a fastener in a structure. In this way cracks may be detected radiating in any direction from the fastener head or other central element, device or structure.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the disclosed system and method.

The invention claimed is:

1. A bistable sensing system for detection of a crack on a structure, the system comprising:
    at least a first channel and a second channel arranged for sealing to a surface of the structure to form respective spaced apart sealed first and second galleries;
    a liquid contained within each of the sealed galleries; and
    a measurement system arranged to measure for a change in a pressure independent physical characteristic of the liquid (a) in the first sealed gallery; (b) in the second sealed gallery; (c) across or between different galleries; or (d) a combination of two or more of (a), (b) and (c) where the change is dependent on a mass flow of the liquid from one of, or between, the sealed galleries through a crack on the structure.

2. The bistable sensing system according to claim 1 further comprising at least one sensing device in each of the galleries the at least one sensing device in communication with the measurement system and arranged to sense or enable the sensing of the pressure independent physical characteristic.

3. The bistable sensing system according to claim 2 comprising a plurality of sensing devices in each gallery.

4. The bistable sensing system according to claim 3 wherein the measurement system is arranged to measure the pressure independent physical characteristic between respective sensing devices in different galleries.

5. The bistable sensing system according to claim 1 wherein the liquid is at a pressure differential in comparison to ambient pressure.

6. The bistable sensing system according to claim 1 comprising one or more compensation galleries wherein the one or more compensation galleries contains a volume of a liquid and is arranged to isolate the liquid from the surface of the structure, the one or more compensation galleries further including at least one sensing device capable of connection to the measurement system.

7. The bistable sensing system according to claim 6 wherein the at least one of the compensation galleries is located between the first and second galleries.

8. The bistable sensing system according to claim 6 wherein each of the compensation galleries, the first gallery and the second gallery are arranged to hold substantially the same volume of liquid.

9. The bistable sensing system according to claim 6 wherein either: (a) the one or more compensation galleries comprises a single compensation gallery containing a volume of fluid that comprises a mixture of respective liquids contained within the first gallery and the second gallery; or (b) the one or more compensation galleries comprises a first compensation gallery containing a volume of the first liquid, and a second compensation gallery containing a volume of the second liquid.

10. The bistable sensing system according to claim 6 wherein the measurement system is arranged to use measurements of the physical characteristic of liquid held within the one or more compensation galleries to compensate for environmental effects on measurements made in relation to the first and second galleries.

11. The bistable sensing system according to claim 1 wherein the measurement system is arranged to perform a measurement cycle comprising either (a) measurements of the physical characteristic of the liquid in respective galleries to provide an indication of operational status of the respective galleries; and in an event of a change in such characteristics to provide an indication of integrity of the structure between the spaced apart galleries; or (b) measurements of the physical characteristic of the liquid in respective galleries to provide an indication of operational status of the respective galleries; and measurements of the physical characteristics across the sensing devices of different galleries to provide an indication of integrity of the structure between the spaced apart galleries.

12. The bistable sensing system according claim 1 wherein the pressure independent physical characteristic is an electrical characteristic.

13. The bistable sensing system according to claim 12 wherein the electrical characteristic is conductance or resistance.

14. The bistable sensing system according to claim 1 wherein the liquid is an electrically conducting liquid.

15. The bistable sensing system according to claim 1 wherein a first liquid is contained within the first gallery and a second liquid is contained within the second gallery wherein the first and second liquids are different to each other.

16. The bistable sensing system according to claim 15 wherein the pressure independent physical characteristic is the presence of: (a) the first liquid in the second gallery; or (b) the second liquid in the first gallery; or (c) a third liquid arising from a reaction between the first liquid and the second liquid.

17. The bistable sensing system according to claim 15 wherein the pressure independent physical characteristic is a variation in a spectral signature of the first liquid or the second liquid arising from a contamination of the first liquid by the second liquid or the contamination of the second liquid by the first liquid.

18. The bistable sensing system according to claim 17 wherein the first liquid contains nanoparticles which when excited by an electromagnetic signal provides a first spectral signature and wherein the second liquid contains nanoparticles which when excited by the same electromagnetic signal provides a second different spectral signature.

19. The bistable sensing system according to claim 17 wherein the at least one sensing device comprises an optical sensor.

20. The bistable sensing system according to claim 1 wherein the sensing devices comprise electrodes.

21. The bistable sensing system according to claim 20 wherein each gallery comprises three electrodes or four electrodes.

22. A bistable sensing system for detection of a crack on a structure, the system comprising:
at least a first channel and a second channel arranged for sealing to a surface of the structure to form respective spaced apart sealed first and second galleries;
a liquid contained within each of the sealed galleries;
a plurality of sensing devices in each of the galleries; and
a measurement system connected to the sensing devices, the measurement system arranged to measure for a change in a pressure independent physical characteristic of the liquid between the sensing devices in each of the sealed galleries and across the sensing devices of respective galleries.

23. A method of monitoring the integrity of a structure, the method comprising:
installing at least a first channel and a spaced second channel on the structure wherein a surface of the structure together with the first channel and second channel form respective first and second galleries;
placing liquids in the galleries; and
monitoring for a change in a pressure independent physical characteristic of the liquid in the galleries or between the galleries; and wherein the change arises from a mass flow of liquid from any one of or between at least of the two galleries through a crack on or in the structure.

24. The method according to claim 23 wherein the monitoring is in relation to a pressure independent physical characteristic: of the liquid in one or more of the galleries; or measured between at least two of the galleries.

25. The method according to claim 23 wherein monitoring for a change in a pressure independent physical characteristic comprises monitoring for change in one or more of: (a) an electrical characteristic; (b) a chemical characteristic; and (c) an optical characteristic, of a liquid in one or more of the galleries.

26. The method according to claim 23 comprising:
installing one or more compensation galleries near at least one of the first and second galleries and in fluidic isolation from the surface of the structure;
placing a liquid in the one or more compensation galleries; and
monitoring for a change in the same pressure independent physical characteristic of the liquid in the one or more compensation galleries as in the first and second galleries.

27. The method according to claim 23 wherein placing liquids in the galleries comprises placing a first liquid in the first gallery and a second liquid in the second gallery wherein the first liquid is different to the second liquid.

28. The method according to claim 27 wherein the monitoring comprises monitoring for presence of a third liquid derived from mixing of the first liquid with the second liquid.

29. The method according to claim 27 wherein the monitoring comprises monitoring for presence of the first liquid in the second gallery or the second liquid in the first gallery.

30. The method according to claim 23 wherein placing liquids in the galleries comprises placing a first liquid carrying nanoparticles of a first spectral signature in the first gallery and placing a second liquid carrying nanoparticles of a second different spectral signature in the second gallery.

31. A bistable sensing system for a structure the system comprising:
at least a first channel and a second channel arranged for sealing to a surface of the structure to form respective spaced apart sealed first and second galleries;
a fluid contained within each of the sealed galleries; and
a measurement system arranged to measure a pressure independent physical characteristic (a) in the first sealed gallery; (b) in the second sealed gallery; (c) across or between different galleries; or (d) a combination of two or more of (a), (b) and (c) where the change is dependent on a mass flow of fluid from one of, or between, the sealed galleries,
wherein the sensing devices comprise electrodes, and
wherein each gallery comprises three electrodes or four electrodes.

32. A bistable sensing system for a structure the system comprising:
at least a first channel and a second channel arranged for sealing to a surface of the structure to form respective spaced apart sealed first and second galleries;
a fluid contained within each of the sealed galleries; and
a measurement system arranged to measure a pressure independent physical characteristic (a) in the first sealed gallery; (b) in the second sealed gallery; (c) across or between different galleries; or (d) a combination of two or more of (a), (b) and (c) where the change is dependent on a mass flow of fluid from one of, or between, the sealed galleries,
wherein a first fluid is contained within the first gallery and a second fluid is contained within the second gallery wherein the first and second fluids are different to each other, and
wherein the pressure independent physical characteristic is a variation in a spectral signature of the first fluid or the second fluid arising from a contamination of the first fluid by the second fluid or the contamination of the second fluid by the first fluid.

33. A method of monitoring the integrity of a structure comprising:
installing at least a first channel and a spaced second channel on the structure wherein a surface of the structure together with the first channel and second channel form respective first and second galleries;
placing fluids in the galleries; and
monitoring for a change in a pressure independent physical characteristic in the galleries or between the galleries; and wherein the change arises from a mass flow of fluid from any one of or between at least of the two galleries,
wherein placing fluids in the galleries comprises placing a first fluid in the first gallery and a second fluid in the second gallery wherein the first fluid is different to the second fluid, and
wherein the monitoring comprises monitoring for presence of a third fluid derived from mixing of the first fluid with the second fluid.

34. A method of monitoring the integrity of a structure comprising:
installing at least a first channel and a spaced second channel on the structure wherein a surface of the structure together with the first channel and second channel form respective first and second galleries;
placing fluids in the galleries; and
monitoring for a change in a pressure independent physical characteristic in the galleries or between the galleries; and wherein the change arises from a mass flow of fluid from any one of or between at least of the two galleries,
wherein placing fluids in the galleries comprises placing a first fluid carrying nanoparticles of a first spectral signature in the first gallery and placing a second fluid carrying nanoparticles of a second different spectral signature in the second gallery.

\* \* \* \* \*